Dec. 15, 1959    T. W. BATTERMAN ET AL    2,917,640
AUTOMATIC PROGRAMMING CONTROL BOARD FOR
AUTOMATIC SHUTTER SYSTEM Filed Oct. 21, 1958    3 Sheets-Sheet 1

FIG. 1

INVENTORS:
THEODORE W. BATTERMAN
MATHEW POBOG

BY *Silverman, Mullin & Cass*
ATT'YS

United States Patent Office 2,917,640
Patented Dec. 15, 1959

2,917,640

AUTOMATIC PROGRAMMING CONTROL BOARD FOR AUTOMATIC SHUTTER SYSTEM

Theodore W. Batterman, Park Ridge, and Mathew Pobog, Danville, Ill., assignors to Electric Eye Equipment Company, Danville, Ill., a corporation of Delaware Application October 21, 1958, Serial No. 768,687

17 Claims. (Cl. 307—115)

This invention relates generally to systems for controlling the operation of an automatic shutter, especially for printing motion picture film, and more particularly is concerned with a programming control board for use with such system.

This application is a continuation-in-part of an application filed by the applicants herein entitled: High Speed Automatic Shutter Mechanism and Control, Serial No. 764,331, filed September 30, 1958, and assigned to the assignee of this application.

The system with which the present invention is used is described in considerable detail in said prior filed application and hence this specification will only describe the system generally and discuss its relationship with this invention. In addition, objects of the invention set forth in said previously filed application are common, to a certain extent with this invention.

The structure described in said previously filed application fills a long-felt need in the art of printing motion picture film from master film. As well-known, during the printing process, it is necessary to control the light used to expose the sensitized film which is passed in contact with the master relative an aperture, the control being effected by movement of an arcuate blade across the beam of light, cutting off more or less of the beam impinging upon the aperture.

The editor who viewed the master film tabulated a list of the scenes and the lighting which is required for each scene in order properly to print the same. As the master film was viewed it was marked with a cuing notch, perforation or metal foil member so that the scenes could readily be identified by the operator of the printing machine. In following the tabulation, each time that a scene was being printed, the operator of prior structures was required to adjust a linkage which pre-set the next position of the shutter. Thus, he was required to be able to make the complete adjustment of the linkage before the end of the previous scene, so that when the following scene arrived all that needed to be done was to release the linkage to permit the shutter to assume its pre-set condition.

As pointed out in said application, higher speeds, color film, more stringent requirements of quality, shorter scenes and the like have given rise to great disadvantages in the use of the manually operated printing machines. The invention described in said application included a completely automatic system in which the entire printing operation was conducted by some programming means operating, with what may be briefly described as a servo system, automatically to position and release the shutter as desired. Two systems were mentioned, one of which utilized a pre-perforated tape upon which the lighting data was punched in a binary code by the use of a perforator such as described in another co-pending application entitled Tape Perforator, Serial No. 764,330, filed September 30, 1958, by the applicants hereof and also assigned to the same assignee as this application. The said tape was passed through a reader which provided the necessary signals to operate the shutter mechanism and its servo system. The second system described is the one with which the invention herein is utilized.

The shutter is adapted to be moved by a linkage or kinematic system which can literally store mechanical movement. The linkage is moved to some position representing a given attitude of the shutter, but prevented from transferring its movement to the shutter until a command pulse or signal releases a novel braking mechanism. The linkage in turn is driven by a suitable cam which is rotated by a servo system that includes a potentiometer having a rotatable slider which provides a voltage related in value to the position of the cam. The potential of the potentiometer is compared with the potential of a bleeder or voltage divider having a plurality of taps each providing a different potential. It will be seen that the operator can choose any desired tap of the bleeder and thereby provide a voltage to be compared with that of the potentiometer. The comparison is done in a bridge circuit which will provide an error signal for driving the motor of the servo system and the rotation of the motor will in turn drive the potentiometer until a condition of balance and hence no error voltage is reached. This rotation also rotates the cam, thereby pre-positioning the shutter moving linkage.

The programming board of the invention herein is a means which enables the taps of the bleeder to be connected into the servo system in any desired sequence, automatically.

This is done in the following manner: The programming board has a large number of selectors in the form of rotary manually operable switches, each switch being provided with a knob and a plurality of contacts. The number of selectors is arbitrary, depending upon the number of scenes usually met with in a typical reel of film. A practical structure of the invention had 150. Each switch may have the number of contacts which represent the different values of light intensity which will be used in printing the film. The usual values in the United States are designated by the numbers 1 to 22 with zero representing complete absence of light, and hence the practical example of the invention had 24 contacts and each selector which included one for a start-stop position, which could be used to re-set the programming board back to its first position, if desired.

The editors tabulation is manually set into the programming board, by moving the knobs to the desired light setting for the consecutive scenes. Thus, the first knob is moved to the setting for scene 1, the second for scene 2 and so on through the complete film. If the number of scenes is less than the number of selectors available, the selector after that which will set the shutter for the last scene is set to a re-set position (designated No. 24 in this specification) and the board is automatically re-set to a condition in which the cycle can be begun once more. This may shut off the printing machine if desired, or can be arranged to re-cycle the program. If the number of scenes is greater than the number of selectors, the board will automatically return from the last selector to the first and commence programming the settings from then on. Thus, after the first few scenes have been printed, the operator can change the settings of the knobs of those selectors to new settings.

After the board has been set up the system is energized and the first scene is printed at whatever setting the shutter has been pre-set to. The first impulse or command signal received from the cueing notch or foil of the film will operate a stepping switch and will connect the second selector through a suitable cable to the comparison circuit of the shutter operating system. The second selector will be set at a contact that connects the designated tap of the bleeder to the bridge to be compared with the voltage of the potentiometer. The resulting error signal will drive the servo system until the bridge is balanced which provides a new cam position. The brake prevents movement of the shutter itself, however, until the scene is completed. When the scene is completed, the next cueing signal or command pulse from the master film will release the brake to cause the shutter to immediately assume the position pre-set for it by the linkage, and will then operate the stepping switch to connect the next selector to the bleeder, and the cycle continues.

Objects of the invention in addition to providing the necessary programming for the shutter system described in said previously filed application, are to provide a compact, simple, and fool-proof programming board for use with any servo system which operates through the comparison of voltages between a rotating potentiometer and a multi-tap bleeder the taps of which are capable of being brought out to a plurality of manually operable selector switches.

Other objects are to provide means for connecting the selector switches in sequence; to provide means for operating electronic numbering tubes in proper sequence along with the selector switches to identify the switch that is connected in circuit; to provide novel switching means for accomplishing the functions of the invention; and to provide many other novel and utilitarian features which will become more apparent as the description hereinafter proceeds.

In order to comply with the patent laws, the invention is described hereinafter in connection with a preferred embodiment which is illustrated in the accompanying drawings in which.

Figure 2:
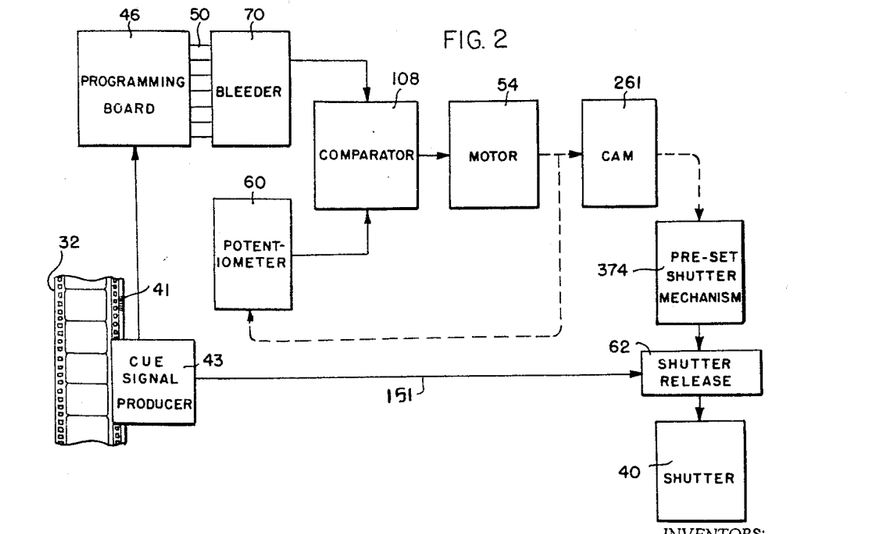
Fig. 2 is a block diagram showing the system with which the invention is adapted to be used.

Referring first to Fig. 2 for the general system with which the board is adapted to be used, the programming board is shown at the left designated as 46 and it has a plurality of connections comprising a cable 50 which connect the various selector switches with the taps of the bleeder 70 so that a voltage from the bleeder is applied to the comparator 108 which may be in the form of a bridge. The potential with which that from the bleeder 70 is compared is derived from a potentiometer 60 whose slider is driven by the servo-motor 54. The servo-motor 54 is also coupled with a cam 261 which in turn moves a pre-setting mechanism 374 whose function it is to eventually position the shutter 40 if permitted to do so by a shutter release mechanism 62. The system is set into operation by the passage of the master film 32 carrying a cueing mark or the like 41 relative to a cue signal producer 43 which provides the command signal that releases the shutter and moves the circuit of the programming board to the next selector switch and connects same to the bleeder 70.

The characters of reference used above are substantially identical with those of the co-pending patent application, Serial No. 764,331, to enable the common structure of these applications to be readily recognized as described thus far.

Figure 1:
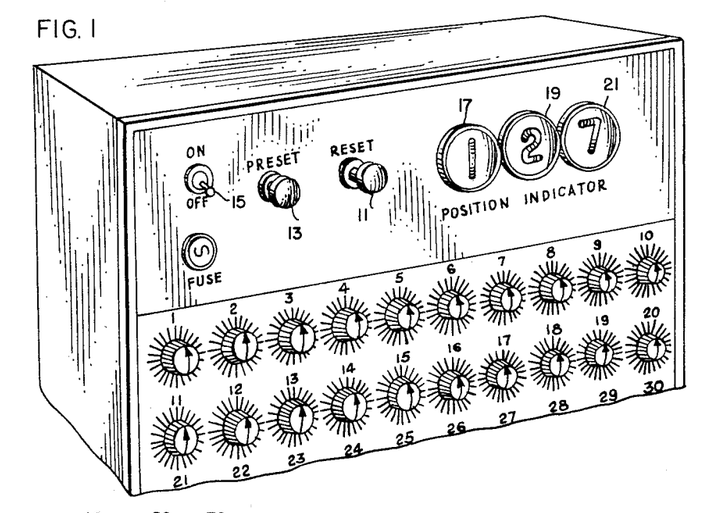
Fig. 1 is a fragmentary perspective view of a programming board constructed in accordance with the invention.
Figure 3:
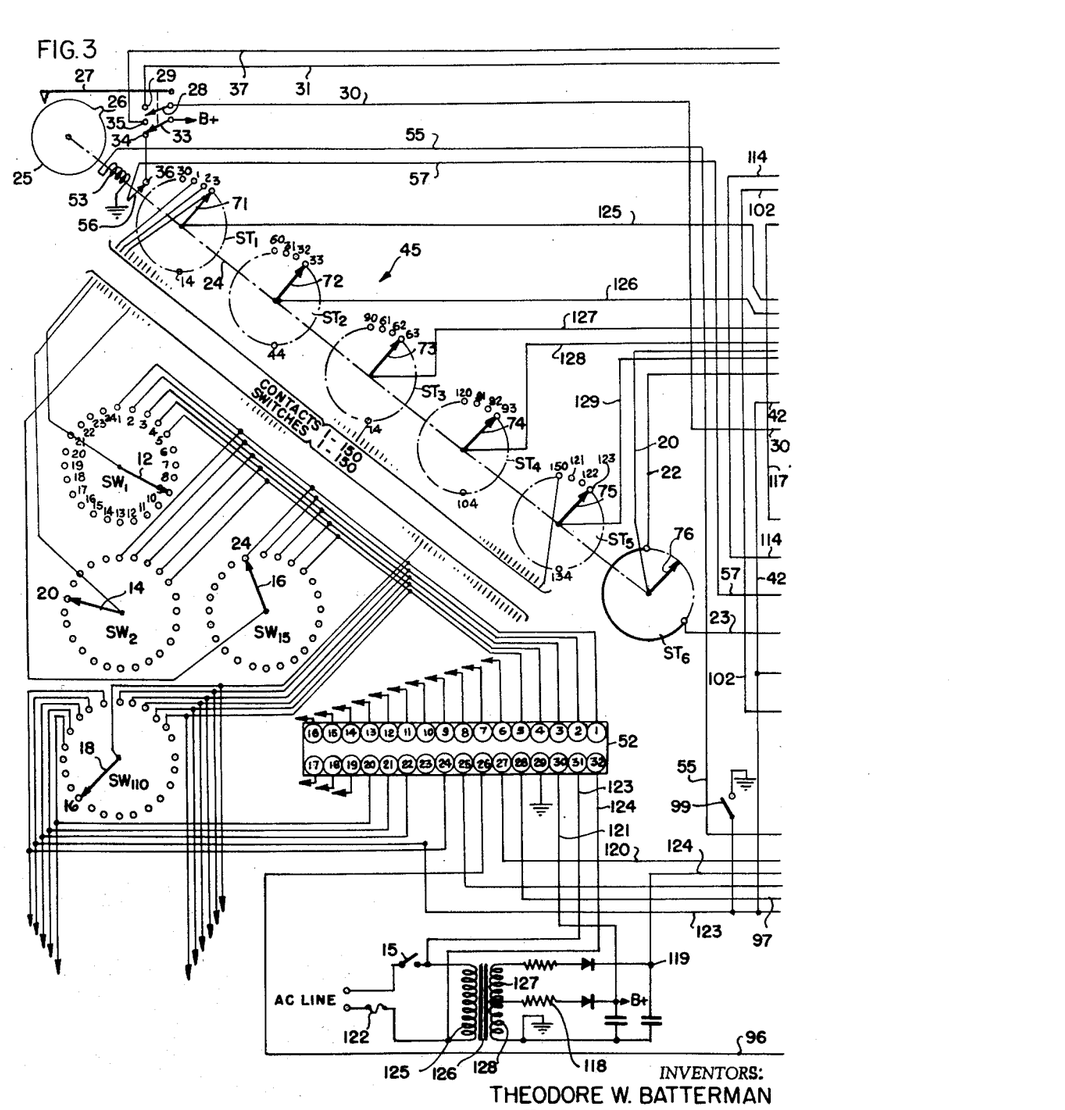
Figs. 3 and 4 together comprise a circuit diagram of the programming control board, the relationship between the figures being shown in the block below Fig. 4.

In Fig. 1 there is illustrated a cabinet 10 of the face of which carries a plurality of selector switches $SW_1$, $SW_2$, $SW_3$, etc., each having a manually adjustable knob which enables a contact arm A1, A2, A3, etc. of the respective selector switches to be engaged with any one of the 24 contacts provided on the switches. In Fig. 3, the contacts of $SW_1$ are the only ones numbered, but all selector switches are constructed identically. Likewise the external dials over which the knobs rotate are suitably numbered to show the positions of the knobs.

Note that in this instance there are 24 contacts, which provide the 22 different intensities of light, a zero setting which is at contact 24, and a setting for re-setting the board which is at contact 23. Also shown in Fig. 1 is a manual re-set button 11, a manual pre-set button 13, a power switch 15, and three electronic numbering tubes 17, 19 and 21. These latter are conventional structures but are required to be energized by applying current to the electrodes thereof in order to cause same to display any one of the ten digits that are provided as filaments. Their purpose is to give a visual display of the number of the selector switch which is connected into the servo system circuit.

Obviously any form of board may be used, either in upright or console form, or in table or desk form.

Figure 4:
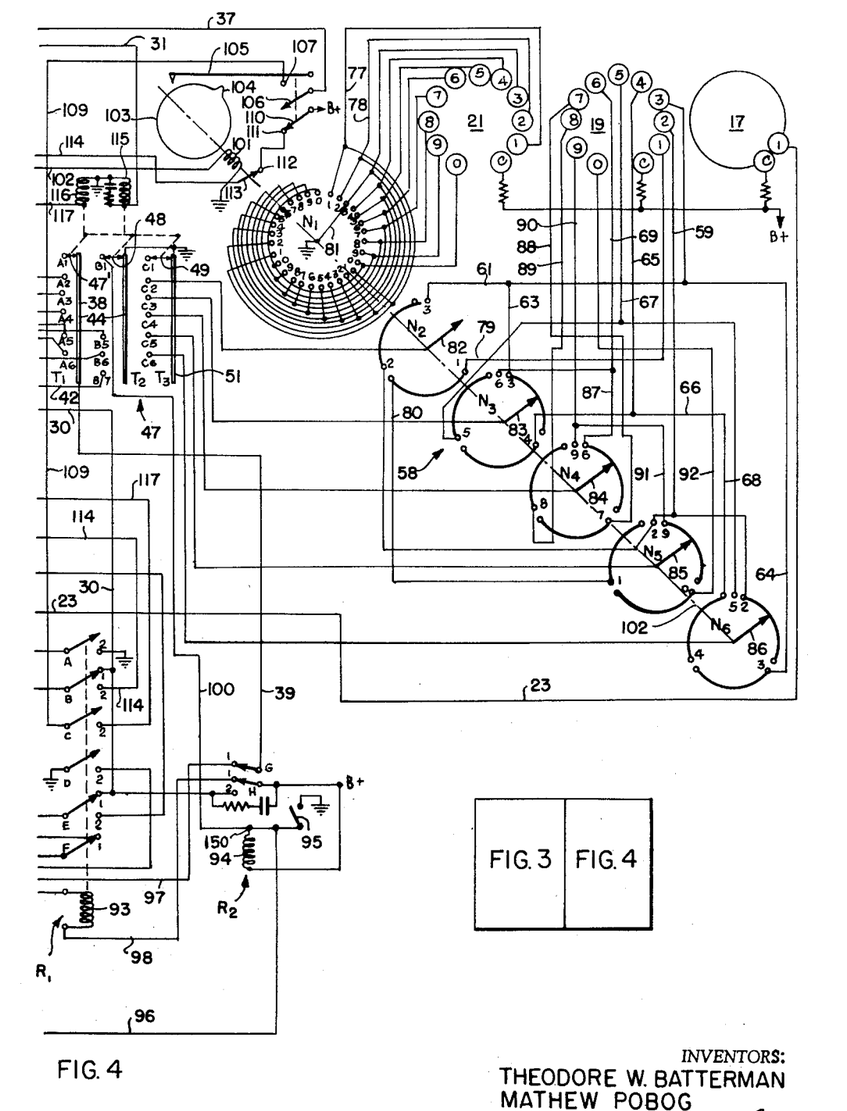

Attention is now invited to the circuit of Figs. 3 and 4. This circuit illustrates in conventional symbols the important structural features of the invention, and wherever possible, repetition has been avoided. Thus, only typical selector switches are illustrated, namely $SW_1$, $SW_2$, $SW_{15}$ and $SW_{110}$, these being arbitrarily chosen for the illustration. All of these switches are preferably identical. Likewise, not all of the connections are illustrated where obvious. All of the number 1 contacts of all selector switches $SW_1$, $SW_2$, $SW_3$, etc. are connected together and extend to the circuit-end terminal 1 of the plug or terminal board 52. Likewise, all of the number 2 contacts go to the circuit-end terminal 2 of the board, and so on, all the way through circuit-end terminal 24. Thus, since 23 terminals are connected to different taps of the bleeder 70, each time a circuit is closed to one of the switches $SW_1$, $SW_2$, $SW_3$, etc., the connected tap of the bleeder is placed in the comparison circuit A unless the switch happens to be on contact number 23.

The structure of the invention is required to connect the switches $SW_1$, $SW_2$, $SW_3$ etc. into the circuit seriatim, i.e., one after the other, with each change of scene. This may be considered a type of "scanning" a plurality of circuits, although the rate at which this is done is intermittent and occurs with the changes of the scenes of the master film. The structure is not limited to such use, however, and could just as easily be connected into a servo system where the function of the system is to mechanically and automatically position a member in any one of a plurality of different positions in accordance with a pre-determined schedule or, program of positions, and the switch circuits could be scanned, that is, connected to the chosen taps of the bleeder by means of scanning device operating at a constant speed independent of external command signals.

In the circuit of the invention, the scanning of the selector switch circuits is accomplished by means of a stepping switch 45 which has a plurality of banks of contact terminals, operating in conjunction with a second stepping switch 47 that also has a plurality of banks of terminals, which will be referred to as tiers, only for distinguishment purposes.

In the claims, the contacts of the selector switches $SW_1$, $SW_2$, $SW_3$ etc. are referred to as "first contacts" to distinguish them from the contacts of the stepping switch 45 which are referred to as "second contacts."

The stepping switch 45, as previously stated has a plurality of banks of contacts, there being six banks provided in the particular structure illustrated, these being designated $ST_1$, $ST_2$, $ST_3$, $ST_4$, $ST_5$ and $ST_6$ and there being a contactor on each bank designated respectively 71, 72, 73, 74, 75 and 76 all ganged together. It should be understood that the representation in Fig. 3 is merely symbolic and not intended to represent particular structure. In the commercial device, the banks were each provided with two rows of contacts and since in the first five banks all of the contacts of one row were connected together, the wiper, slider or contactor of these banks may be represented by a simple pivoted arm, while the independent contacts may be shown as those terminals over which the contactors pass in their rotation. Each bank $ST_1$, $ST_2$, $ST_3$, $ST_4$ and $ST_5$ has thirty contacts equally spaced so that rotation of the respective contactor will be continuous. These contacts are connected as follows:

In the bank $ST_1$ the contacts are connected to the wiper arms of the switches $SW_1$ to $SW_{30}$ respectively, so that the contact terminals of $ST_1$ would be conveniently numbered 1 through 30 inclusive. Only a few of the contacts are shown, but obviously they extend completely around the circle representing the bank. Of the four selector switches $SW_1$, $SW_2$, $SW_3$ and $SW_{110}$, shown in the circuit diagram as typical, obviously the wiper arms 12, 14, and 16 of the first three are connected to terminal contacts of the bank $ST_1$. This is also true of the other 27 of the first thirty selector switches which are not shown.

In the bank $ST_2$ the contacts are numbered 31 to 60 inclusive and are connected to the wiper arms of the next thirty selector switches $SW_{31}$ to $SW_{60}$ respectively.

In the bank $ST_3$ the contacts are numbered 61 to 90 inclusive and are connected to the wiper arms of the next thirty selector switches $SW_{61}$ to $SW_{90}$ respectively.

In the bank $ST_4$ the contacts are numbered 91 to 120 inclusive and are connected to the wiper arms of the next thirty selector switches $SW_{91}$ to $SW_{120}$ respectively. The selector switch $SW_{110}$ illustrated as typical would be in this group and has its wiper 18 connected to the contact terminal 110 of said bank $ST_4$.

In the bank $ST_5$ the contacts are numbered 121 to 150 inclusive and are connected to the wiper arms of the next thirty selector switches $SW_{121}$ to $SW_{150}$ respectively.

Other banks and selector switches could be used, and the number of terminals per bank need not be thirty, which happens to be a multiple of 150, the total number of selector switches $SW_1$, $SW_2$, $SW_3$ etc.

The sixth bank $ST_6$ is not used to scan the selector switches, but has a completely different purpose to be described. Its first nine pairs of contacts are not connected in the circuit, and the remaining 21 contacts of each row are all connected together so that in effect there is a connection established between them whenever the contactor 76 is between the 10th and 30th contacts inclusive. This closes a circuit to the conductors 20 and 22. The conductor 22 connects through the bank with the conductor 23.

All of the contactors 71 to 76 are mounted for ganged rotation on the same shaft, indicated by the broken line 24 along with a cam or the like 25 which has a projection 26 that raises the arm 27 once with each revolution of the contactors thereby moving the switch arm 28 to the contact terminal 29 to close the circuit between the conductors 30 and 31, while also moving the switch arm 33 from the contact terminal 34 to the contact terminal 35 thereby changing the application of power from the contact terminal 36 to the conductor 37.

The step switch 45 operates in conjunction with the step switch 47 (Fig. 4) to scan the selector switches $SW_1$, $SW_2$, $SW_3$ etc. in their consecutive order. Generally the step switch 47 is energized every thirty steps of the step switch 45 to enable the respective banks to be consecutively connected into the circuit.

The step switch 47 has three tiers of contacts designated $T_1$, $T_2$ and $T_3$, each of which has a slider designated respectively 47′, 48 and 49. The tiers each have a common bus and seven contacts over which the respective slider moves. Not all contacts are in the circuit and hence only those used are shown along with the first contact of each tier, this being the initial position of the sliders before movement. Tier $T_1$ has the contacts designated A1, A2, A3, A4, A5 and A6 only the latter five being active, and its slider 47′ establishes connection between these contacts and the bus 38. This bus is connected with the conductor 39. The contacts A2, A3, A4, A5 and A6 connect respectively to the wiper arms 71, 72, 73, 74 and 75.

Tier $T_2$ has the initial contact B1 and three additional contacts all of which are active, these latter being B5, B6 and B7 connected respectively to the conductors 20, 22 and the conductor 42. The bus 44 is grounded as is the bus 51 of tier $T_3$. This latter tier has the contacts C1, C2, C3, C4, C5 and C6, only the latter five being connected into the circuit as will be described.

The contactors 71 to 76 and the cam disc 25 are advanced a step at a time, that is, the circumferential distance between two adjacent contact terminals of the banks $ST_1$, $ST_2$, $ST_3$ etc. each time that an electrical pulse is applied to the solenoid 53 by a suitable signal derived by way of the conductor 55 in a manner to be described. Note that each time the solenoid 53 steps the switch 45, it moves the switch arm 56 off the contact 36 and disconnects the conductor 57 from the power supply through the switch arm 33.

As will be described, the circuit is such as to consecutively scan the selector switches $SW_1$, $SW_2$, $SW_3$ etc., but since this is an electrical situation involving a large number of switches, the invention has provided a visual indication of the position of the scanning means—that is, the number of the selector switch which is connected in the circuit through the combined action of the switches 45 and 47, these latter two together being considered the scanning means.

There are provided three conventional electronic numbering tubes or cells 17, 19, and 21, whose purpose is to display the digits of a number representing the scanning position. The tube 17 provides the hundreds digits, and since in the structure of the example there were only 150 selector switches, the number 1 terminal of this tube is the only one used. It is connected to the conductor 23. The tube 19 is the tens digits tube and all ten of its terminals are used. The tube 21 is the single digits tube and all ten of its numeral terminals are used. All three tubes have common terminals marked "C" which are connected through dropping resistors to the B+ supply. When a circuit is connected between any numeral terminal and ground the numeral filament whose terminal is involved will glow and be seen on the front of the cabinet 10.

A stepping switch 58 similar to the switch 45 is provided for operation to cause the display of the numerals representing scanning position. There are also six banks, designated $N_1$, $N_2$, $N_3$, $N_4$, $N_5$ and $N_6$ each provided with a wiper arm or contactor 81, 82, 83, 84, 85 and 86, respectively. The first arm 81 is grounded. Arm 82 is connected to the contact C2 of tier $T_3$, and arms 83, 84, 85 and 86 are likewise connected to the respective contacts C3, C4, C5 and C6. Of the banks, the only bank with all contacts used individually is the first, bank $N_1$. Its contacts are numbered 1 to zero, thus providing three groups of ten, with all of the 1's connected together and extending by the lead 77 to the number 1 terminal of tube 21, all of the 2's connected together and extending by the lead 78 to the number 2 terminal of the tube 21, and so on, with each group of contacts connected to the corresponding numeral terminal of the tube 21.

The bank $N_2$ has the first nine contacts disconnected. The next ten contacts are connected together and marked with the numeral 1 representing the numbers from 10 to 19 in the indicator tubes 19 and 21 and these are connected to the number 1 terminal of the tube 19 by the lead 79, while also being connected to the terminals 20 to 29 of the bank $N_5$ by the lead 80 which terminals of $N_5$ are all connected together and marked 1. The next ten contacts of the bank $N_2$ are also connected together and marked with the numeral 2 representing the numbers 20 to 29 in indicator tubes 19 and 21 and these are connected to the number 2 terminal of the tube 19 by the lead 59 which also connects the 30th contact of the bank $N_5$, marked with the number 2, and the first nine contacts of the bank $N_6$ marked with the number 2.

The connections to banks $N_5$ and $N_6$ enable the step switch 58 to provide the numbers 110 to 119 in the indicator tubes and the numbers 120 to 129 as will be explained. The numbers 0 to 9 in indicator tube 21 are provided by connections of bank $N_1$.

In a similar manner the connections for the banks are made to the indicator tubes to provide the numeral indications. The following tabulates the connections for the banks:

| Bank | Contacts | Marked | Additional connections | Conductors | To provide display numbers |
| --- | --- | --- | --- | --- | --- |
| $N_2$ | 10–19 | 1 | $N_5$—20–29 | 79, 80 | 10–19, 110–119 |
| $N_2$ | 20–29 | 2 | $N_5$–30, $N_6$—1–9 | 59 | 20–29, 120–129 |
| $N_2$ | 30 | 3 | $N^3$—1–9, $N_6$—10–19 | 61, 63, 64 | 39–39, 130–139 |
| $N_4$ | 10–19 | 4 | $N_6$—20–29 | 65, 66 | 40–49, 140–149 |
| $N_4$ | 20–29 | 5 | $N_6$—30 | 67, 68 | 50–59, 150 |
| $N_4$ | 30 | 6 | $N_4$—1–9 | 69, 87 | 60–69 |
| $N_3$ | 10–19 | 7 |  | 88 | 70–79 |
| $N_3$ | 20–29 | 8 |  | 89 | 80–89 |
| $N_3$ | 30 | 9 | $N_5$—1–9 | 90, 91 | 90–99 |
| $N_3$ | 10–19 | 0 |  | 92 | 100–109 |

By way of explanation of this chart, the first column is the bank involved, the second column describes the contacts of the bank that are connected together. In considering the numbers of the contacts, the banks each have thirty contacts circumferentially equi-distant like those of the step switch 45, and the numbering is clockwise with the top contact being considered the 30th. The third column has the numeral with which the groups of contacts, or the single contacts in several cases, are marked. All inter-connected contacts have the same numeral which is also the numeral of the contact terminal of tube 19 to which the groups are connected. The fourth column identifies the other groups and individual contacts included in the same circuit and the fifth column contains the characters of reference applied in Fig. 3 to the leads or conductors associated with the particular group. The last column lists the display numbers to which the particular group will contribute during operation of the device. The only group of numbers not present is that from 0 to 9. These are provided by the connections of bank $N_1$ and tube 21. Incidentally, the last digit of all numbers will be provided by the bank $N_1$ which merely repeats itself three times for each revolution.

There are two relays $R_1$ and $R_2$ which are energized to cause operation of the entire device and these will now be described.

Relay $R_1$ includes a solenoid 93, six switch arms A, B, C, D, E and F and a plurality of contacts to be engaged by the switch arms whose normal position is upward. The upper contacts are designated simply by small numerals 1, and the lower contacts are designated by the small numerals 2. Those contacts not contributing to the operation of the circuit are omitted.

Relay $R_2$ includes a solenoid 94, two switch arms G and H and several contacts identified like those of relay $R_1$. Normal position of the arms is upward.

One side of the relay solenoid 94 is connected through a switch 95 to ground. This switch 95 is operated by the manual pre-set button 13 which is located on the front panel of the cabinet 10 and enables the programming board to be operated without automatic pulsing merely by pressing the button whenever a new setting of the shutter pre-set mechanism is desired. This same circuit is connected through the lead 96 from the terminal 150 to the circuit-end terminal 26 so that the command pulses from the cue-signal producer 43 will serve to step the stepping switch means of the circuit through energization of the solenoid 94. It should be pointed out that the cue signal producer 43 is so arranged that it also applies a signal through the general path 151 to the shutter release, and the construction of the stepping switch means of the device is such that the actual command pulse does not do the stepping, but rather the completion thereof does, so that the shutter is released to its previously set position before the new position is produced by the operation of the servo system. Through the circuit-end terminal 26 other components in the systems may have switches to enable the manual pulsing of the relay $R_2$ remotely.

Note that the terminal 150 is connected by way of the lead 100 to the contact B1 of tier $T_2$ so that the circuit to ground through the solenoid 94 may also be closed through B1. The opposite side of the solenoid 94 is connected to B by means of which the power for operating the relay $R_2$ is provided.

Upper contact 1 of the switch arm G is normally connected with said switch arm and extends to the terminal 28 of the plug 52 by way of the lead 97. Since G is connected with the lead 39 and the bus 38, and this terminal 28 extends to the comparator 108, the lead 97 provides a common conductor for whichever one of the selector switches happens to be connected into the circuit and the terminal 28 may be considered the common terminal for the selector switch circuits.

The upper contact 1 of the switch arm H is connected in series with the solenoid 93 by way of the conductor 98, the other terminal of the solenoid 93 being connected also to the re-set terminal 23 and all of the contact terminals numbered 23 of the switches $SW_1$, $SW_2$, $SW_3$ etc. The relay $R_1$ is a re-set relay, that is, when operated, all of the wipers of the step switches 45, 47 and 58 are returned to their zero positions. Thus, if any of the selector switches $SW_1$, $SW_2$, $SW_3$ etc. had been manually set by its knob to position 23, when in the course of scanning that switch was connected into the circuit, the entire circuit would be re-set to zero. The same effect can be obtained manually through closing the switch 99 by pressing the button 11 on the cabinet 10, this switch grounding the solenoid 93 and completing the energizing circuit thereof. There may be similar re-set switches located throughout the system which would ground a conductor connected to circuit-end terminal 23 of the plug 52, but in the structure shown, the circuit-end terminal 23 is open.

The upper terminal of the solenoid 93 is also connected to the switch arm A and the contact B7 by the conductor 42. Obviously when the slider 47' engages the contact B7, grounding the same through the buss 44, the solenoid 93 will energize the re-set relay $R_1$.

The step switch 58, as previously stated, is practically the same as step switch 45. It is stepped by the solenoid 101, one side of which is grounded and the other side of which is connected by the lead 102 to the switch arm B of the relay $R_1$. Switch arm B in turn normally engages the contact 1 which connects with the conductor 30, the upper contact 1 of the switch arm E and the lower contact 2 of the switch arm H of the relay $R_2$. Note that switch arm E of relay $R_1$ connects to the other stepping colenoid 53 by way of the conductor 55.

The pulsing of the solenoid 101 will rotate all of the contactors 81, 82, 83, 84, 85 and 86 simultaneously through a commonly connected shaft, shown symbolically at 102, along with the cam disc 103 which carries the projection 104. Once each revolution, the arm 105 is lifted, carrying the switch arm 106 into engagement with the contact 107 and closing the circuit between the conductor 37 and the conductor 109. This latter lead is connected to the switch arm C of relay $R_1$. At the same time this occurs, the switch arm 110 which is connected to B+ is moved off the contact 111 thereby opening the circuit which includes the contact 112, switch arm 113, and the lead 114. This latter lead connects to the lower contact 2 of the switch arm B of relay $R_1$. The switch arm 113 is moved from the contact 112 each time the solenoid 101 is pulsed.

The step switch 47 is stepped forward by energizing the solenoid 115, one side of which is grounded and the other side of which is connected by the lead 31 to the contact 29 of switch arm 28. The switch is returned to its initial position by energizing the reset solenoid 116, one side of which is grounded and the other side of which is connected by way of the lead 117 to the lower contact 2 of the switch arm C of relay $R_1$.

The source of power for the programming board and as well the remaining components of the system may be provided in the cabinet 10. As shown in the diagram of Fig. 3, there is a rectifier 118 which has two D.C. outputs, one of which appears at the terminal 119 and is conducted to the switch arm F, through its contact 1 by the lead 120 to the terminal 27 of the plug 52. The other output is marked B+. A lead 121 connects terminal 30 of the plug 52 with B+ to make this available to other components of the system, if desired. The input to the rectifier is a conventional A.C. line including a switch 15, fuse 122 and A.C. leads 123 and 124 to the terminals 31 and 32 of the plug 52, thereby making the 110 volt A.C. power available to other components of the system. The line is applied to the primary winding 125 of the power transformer 126, the secondaries 127 and 128 providing the increased voltage for the operation of the board. The conventional elements comprising resistors, filter condensers, rectifiers, as well as antisparking networks which are illustrated are not designated since their functions are obvious and well-known.

The relays $R_1$ and $R_2$ and all of the switches of the circuit are shown in their normal positions. It may be presumed that the selector switches have all been moved to their proper positions for programming the printing of a reel of master film 32. Note that the first switch $SW_1$ is on contact 9, the second $SW_2$ is set for contact 20. All of the step switches 45, 47 and 58 are on their zero positions.

As soon as the power switch 15 is closed the following functions occur:

(a) If we presume that we had manually stepped all of the step switches to their zero positions, that is, to the positions where the projections 26 and 104 are in engagement with the arms 27 and 105 respectively, the contactors 71, 72, 73, 74, 75 and 76 would all be on their respective contacts 30, 60, 90, 120, and 150. Likewise, the contactors 81, 82, 83, 84, 85 and 86 would be positioned on contacts 0, 3, 6, 9, 2 and 5 of the banks $N_1$ to $N_6$ respectively representing the position of the 30th contact of each bank. In this circumstance, a circuit is completed from B+ through the solenoid lead 100, contact B1 of tier $T_2$, slider 48 and bus 44 to ground, thereby energizing the solenoid 94 and pulling down the arms G and H. It will be seen by tracing the circuits that all of the solenoids 53, 115 and 101 will not be energized until the bottom contact 2 of the switch arm H of relay $R_2$ is engaged by the switch arm to energize them from the potential source B+. On zero, that is, 30th contact position, these are all open. The solenoid 93 is also open, since it connects with the contact B7 of the tier $T_2$.

(b) As soon as the pre-set relay $R_2$ operates, all three of the solenoids 53, 115, and 101 are energized through contact 2 of switch arm H and the circuit is in the direction shown in Fig. 3, since all of the contactors of all banks advance to number 1 contact position (all are shown in number 3 position in the illustration, but the positions of the switch arms is the same).

(c) All of the sliders of the step switch 47 advance one step so that the sliders 47' and 49 are on contacts A2 and C2 respectively. Slider 48 is open and the solenoid 94 therefore becomes de-energized, and arms move back to contacts 1.

We may now trace the various circuits to see what the nature of the connections are.

First, the common terminal 28 is connected by way of the lead 97, switch arm G, lead 39, bus 38, slider 47', contact A2, contactor 71, contact number 1 of the bank $T_1$, connecting lead from contact number 1 to the wiper arm 12 of the selector switch $SW_1$, contact number 9 of that switch to the circuit-end terminal 9 of the plug 52. This extends back to the number 9 tap of the bleeder 70 so that the potential of that tap can be compared with the potential picked off the potentiometer 60. This therefore sets the servo system into operation to cause the pre-positioning mechanism of the shutter 40 to operate.

In the meantime, of course, the master film is passing through the printer and being printed at a light intensity which is determined by the previously set condition of the shutter pre-set linkage. If this is the second time that the entire 150 selector switches are begun, the film is being printed at a light intensity which is determined by the setting provided by the selector switch $SW_{150}$.

If this is the beginning of a film printing job, however, the step switch 45 would immediately step the contactors 71, 72, 73, 74, 75 and 76 to the number 2 position, and connect $SW_2$ in the circuit, through the circuit-end terminal 20 (not that the wiper 14 is on contact 20) to commence the setting up of the next position of the shutter 40. This is done either by pulsing the relay $R_2$ manually when the film has been started to cause it to immediately set up the conditions for the first scene.

From what has been described, it is obvious that there is actually no zero position of the programming board. Immediately that the board is energized it steps itself to the condition connecting the first switch $SW_1$ into the circuit, and if a cuing notch or mark is placed on the master film at the beginning of the first scene, the shutter 40 will first be released to the number 1 position according to the setting manually placed on the selector switch $SW_1$ when the common signal is received, after which the switch $SW_2$ will be connected into the circuit and remain so until the end of the first scene, at which point a command pulse will step the contactors to the next position, etc.

The circuits to the two numeral tubes 19 and 21 are likewise changed to give the proper numerals. When solenoid 53 is energized, so is solenoid 101. For the first nine steps, the contactor 82 is free and since $N_2$ is the only bank connected with the step switch 47, there is no display in either tube 17 or 19. Bank $N_1$ has its contact always grounded, and hence, the tube 21 will constantly display one of the digits from 1 to 0 as the switch 58 is stepped. As soon as the contactor 82 reaches the number 1 grouping on contacts, the digit 1 filament glows in tube 19, which together with the digit of tube 21 gives the number of the selector switch which is in the circuit with the comparator 108.

As the stepping continues, for the first 30 switches $SW_1$ to $SW_{30}$, contactor 71 is engaging the contacts 1 to 30 of bank $ST_1$ and making circuit through the contact A2 of tier $T_1$ of stepping switch 47. Contactor 82 of bank $N_2$ is grounded through C2 of tier $T_3$ for displaying the numerals 1 and 2 in the tube 21 with the digits being displayed through the simultaneous movement of contactor 81 of $N_1$ in the tube 21.

Note that when the 30th contact of $ST_1$ is reached, the switch 45 will not step immediately but will await the 30th command pulse because now the slider 48 is not engaged with the contact B1. When this 30th command signal is received, solenoid 115 will be pulsed to the 3rd row of contacts and the scanning will continue through switches $SW_{31}$ to $SW_{60}$ while bank $N_3$ provides the numerals 3, 4 and 5 for the tube 19. Note also that for the 30th contact position of contactor 82 it is on the single number 3 contact while contactor 81 is on a zero contact so that the tubes 19 and 21 display the numeral "30." (The tubes are reversed in their positions in Fig. 4.) Likewise the 60th command pulse produces the numeral "60" in the tubes 19 and 21.

This process continues through the connection of $SW_{99}$ into the circuit. At this time, the contactor 73 will be on the 9th contact of the bank $ST_4$, which is the number 99 contact; slider 47' will be engaged with the contact A5; slider 48 will be engaged with the contact B5 which in turn is connected to the interconnected contacts of bank $ST_6$ but open at this point because contactor 76 not engaging the connected contacts. The contactor 85 is connected with the contact C5 which is grounded through slider 47' and buss 51. The tube 19 and 21 display the numeral "99".

The next pulse carries the contactor 76 into engagement with the connected contacts of bank $ST_6$. This grounds the circuit of the number 1 contact of tube 17 through lead 23, connected contacts of bank $ST_6$, contactor 76, lead 20, contact B5, slider 48 and buss 44. Thus, the digit "1" appears on the tube 17. The other tubes 19 and 21 display zeros for the 100th command pulse.

Thereafter, as the device continues to scan the switches $SW_{100}$ to $SW_{120}$ the conditions described prevail, except that the respective selector switches are connected into the circuit seriatim, and the zero and numeral "1" appear on the tube 19 for ten and nine respectively of the next 19 steps. At 120, the numeral "2" appears on the tube 19, as may readily be seen by tracing the circuit, and the next command pulse accomplishes the following:

The three sliders 47', 48 and 49 are moved down to the contacts A6, B6 and C6, connecting bank $ST_5$ into the scanning circuit, connecting bank $N_6$ into the numbering circuit, and connecting the grounded buss 44 directly with the lead 23 through the conductor 22 and the grounded contacts of the bank $ST_6$. The contactor 76 moves to the blank portion of the bank $ST_6$ but this does not affect the numbering circuit because the numeral 1 terminal of tube 17 is now continuously connected to ground and always displays the numeral "1" through the next 29 steps which brings the total number of steps to 150 and inserts the selector switch $SW_{150}$ into the circuit.

From the 150th step to the next brings the scanning of the switches to a completion. This movement will again energize the solenoid 115, and will disconnect sliders 47' and 49 from any contacts, but will bring slider 48 into engagement with the contact B7. Tracing the circuit thereby closed, it is seen that B7 grounds the solenoid 93 through the conductor 42. This being the re-set solenoid, relay $R_1$ is operated and closes switch arm C upon contact 2, energizing solenoid 116 by way of the lead 117, from B+ through the lead 109, contact 107, switch arm 106, lead 37, contact 35, and switch arm 33.

The switch arm D and contact 2 are used through the terminal 25 of the plug 52 to energize a circuit or circuits in other components of the system when the circuit is re-set for use. Switch arm A and contact 2 are for holding the relay $R_1$ energized until a step has been taken which deenergizes solenoid 93 through movement of switch arm H.

The reset described above will occur when the entire number of switches $SW_1$, $SW_2$, $SW_3$ etc. have been scanned, or it may be caused to occur at any time that any desired number of switches have been scanned by merely setting the following switch at the position 23 which will cause energizing of the reset relay $R_1$ through the common terminal 28 and one side of bleeder 70.

Further explanation of the operation of the device may be dispensed with for brevity, it being obvious from the circuit how the various parts of the structure operate for different conditions. As previously stated, the use of an intermittent command pulse is not considered to be a limitation, since the circuit may be pulsed either manually, or automatically and periodically by any suitable means.

What it is desired to secure by Letters Patent is:

1. A programming device for use in a system in which a plurality of operations are to be consecutively performed upon command signals, each operation being performed under one of a plurality of conditions, and there being an electrical circuit for each condition, said device having a common output terminal and a plurality of circuit-end terminals each adapted to be connected to a particular one of said electrical circuits of said system, a plurality of manually adjustable selector switches each having a wiper and a number of first contacts equal at least to the number of circuit-end terminals and adapted to be pre-adjusted to position the wiper of each selector switch to a pre-determined one of said first contacts, the similarly located first contacts of each selector switch being connected together and to the respective circuit-end terminals so that each of said circuit-end terminals connects with a similarly positioned first contact on all selector switches, stepping switch means having a plurality of second contacts each connected to one of said wipers in the order in which it is desired that the selector switches be scanned, a common connection from the stepping switch means to the common output terminal, and means for closing the circuit of said stepping switch means from second contact to second contact in consecutive order each time a command signal is applied thereto so as to scan the selector switches and complete a circuit between said common output terminal and one of said circuit-end terminals through the consecutive selector switches, whereby for each command signal the circuit-end terminal will be included in the completed circuit which corresponds to the chosen one of said first contacts of the particular selector switch connected into said circuit by said step switch means.

2. A structure as claimed in claim 1 in which said stepping switch means includes a plurality of banks of second contacts, each bank having the same number of second contacts and the said number being substantially less than the number of selector switches, and said circuit closing means of said stepping switch means including a movable contactor on each bank and all contactors ganged to move in unison one step over the second contacts of all banks each time that a command pulse is applied to said device, and means for transferring the common connection from one bank to the next after each complete cycle of movement of said contactors, whereby during the scanning of said selector switches, the circuit to said common output terminal will be closed seriatim through each of the said second contacts of the banks, bank by bank.

3. A structure as claimed in claim 2 in which said stepping switch means includes two stepping switches, one having said banks and the other having a plurality of contact terminals and a slider, the slider adapted to move from contact terminal to contact terminal for each complete cycle of said contactors, and said contact terminals being connected to at least some of the respective banks to enable said afore-mentioned transfer.

4. In a system for performing a plurality of operations each being performed under a different condition depending upon the completion of a different circuit in the system, and each operation adapted to be performed by the production of a command pulse in said system, means for programming the operations and comprising a plurality of selector switches each manually adjustable to a separate one of a plurality of different positions, each selector switch having at least a certain number of positions and all the similarly located positions of each selector switch being connected to a circuit-end terminal so that there are as many circuit-end terminals as said certain number of positions but each circuit-end terminal has one connection to every switch, a common terminal, and the programming means being connected into said system so that whichever selector switch is in the circuit of said programming means, the adjusted position thereof will provide the particular circuit of the system to prescribe the operation conditions, each selector switch having a common junction, stepping switch means having a plurality of contacts one connected with each of said common junctions, means energized by said command pulse establishing a connection between said common terminal and the contacts of said stepping switch means one at a time to scan the selector switches.

5. A structure according to claim 4 in which display numbering means are provided adapted to be energized to indicate the identification of the selector switch which is connected into the circuit, and second stepping switch means are provided operated in synchronism with said first stepping switch means and having a plurality of energizing circuits connected with said numbering means for selectively energizing the same with each command pulse.

6. A structure according to claim 4 in which said stepping switch means include a plurality of banks of said contacts and contactors ganged to scan said banks and means are provided for switching from bank to bank once for each cycle of scanning of a bank.

7. A structure according to claim 4 in which said stepping switch means includes a plurality of banks of said contacts and contactors ganged to scan said banks and means are provided for switching from bank to bank once for each cycle of scanning of a bank, comprising an electromagnetically energized multiple position switch, an energizing circuit for said switch, each position closing a circuit to a different bank, and a circuit closer ganged with said contactors and arranged to operate once each cycle to close a circuit for energizing said multiple position switch.

8. A circuit closing device adapted to be operated by receipt of a series of command signals, having a plurality of circuit-end terminals and a common output terminal, the circuits adapted to be selectively closed between a pre-determined one of said circuit-end terminals and said common output terminal each time that a command signal is received, said device including a plurality of selector switches each having a plurality of first contacts connected to the respective circuit-end terminals, and each having a manually adjustable contact arm enabling each switch to be positioned with the contact arm engaging any one of its first contacts, step switch means having a plurality of second contacts each contact being connected with one of said contact arms, contactor means adapted to engage said second contacts and connected with said common output terminal, and electromagnetic relay means adapted to be energized by said command signal to step said contactor means from second contact to second contact to scan said selector switches and close one of said circuits with each step.

9. A structure as claimed in claim 8 in which said step switch means includes a connection closed through said electromagnetic relay means for the initial position of said step switch means whereby said device will step once when same is initially energized.

10. A circuit closing device adapted to be operated by receipt of a series of command signals, having a plurality of circuit-end terminals and a common output terminal, the circuits adapted to be selectively closed between a pre-determined one of said circuit-end terminals and said common output terminal each time that a command signal is received, said device including a plurality of multiple-position switches each having a manually adjustable member for setting same in one of said positions and each having a common conductor and a terminal point for each position, at least a certain number of the terminal points of each switch being respectively connected to said circuit end terminals, step switch means having a plurality of contacts and contactor means connected with said common output terminal and adapted to engage said contacts, each contact being connected to a common conductor of a multiple-position switch whereby the number of contacts is the same as the number of multiple-position switches, first electromagnetic means adapted to be energized by said command signal to move said contactor means one step for each signal to scan said contacts and close said circuits through said multiple-position switches one at a time, and second electromagnetic means adapted to be energized by a suitable re-set signal to return said contactor means to initial position from engagement with any contact.

11. A structure as claimed in claim 10 in which said multiple-position switches each includes a reset position and terminal point, and said device includes means energizing said second electromagnetic means through said reset position rendered operative in the course of scanning said multiple-position switches when a multiple-position switch which has been set at said re-set position is in the closed circuit.

12. A structure as claimed in claim 10 in which there is an energizing circuit closed to said second electromagnetic means when all of said multiple-position switches have been scanned whereby to return the contactor means to initial scanning position.

13. A structure as claimed in claim 10 in which number display means are provided for displaying the number corresponding to the one of the multiple-position switches which is in the circuit closed by said contactor means at any time during the scanning, and said device has second step switch means provided with second contactor means and second contacts connected to selectively energize said number display means in synchronism with said stepping of said first step switch means.

14. A structure as claimed in claim 10 in which electronic number display means including a digits part and a tens part are provided adapted to be selectively energized in synchronism with said step switch means to display numbers corresponding to the number of multiple-position switches scanned, in which an electromagnetically repetitive multi-contact driven switch is connected with said digits part to repeatedly energize same during the stepping of the step switch means and regardless of how many steps have been taken, and in which there are other electromagnetically actuated switch means operating in synchronism with said multi-contact switch and having connections with said tens part which are energized once each consecutively for each ten steps to provide the tens digit displays on said tens part.

15. A structure as claimed in claim 10 in which there are at least three electronic numeral display tubes, a multiple bank stepping switch synchronized to step with said step switch means, the first bank having a plurality of contacts connected to the first tube and adapted during the stepping to repeatedly energize said first tube to display the ones numerals, the other banks having a plurality of connections with said second tube and being arranged to change from digit to digit for each ten steps so as to cause the display of the tens numerals in said second tube, and circuit means closed to said third tube but only after ninety-nine steps have been made, whereby to energize the same and display a numeral one thereon.

16. A structure as claimed in claim 15 in which said last mentioned circuit means is associated with and closed by step switch means.

17. A circuit closing device adapted to be operated by receipt of a series of command signals, having a plurality of circuit-end terminals and a common output terminal, the circuits adapted to be selectively closed between a pre-determined one of said circuit-end terminals and said common output terminal each time that a command signal is received, said device including a plurality of multiple-position switches each having a manually adjustable member for setting same in one of said positions and each having a common conductor and a terminal point for each position, at least a certain number of the terminal points of each switch being connected respectively to the circuit-end terminals, an electro-magnetically energized first step switch having a plurality of banks of contacts, there being a group of contacts substantially less than the number of multiple-position switches on each bank, and each contact being connected to one of said common conductors, a contactor on each bank adapted to move in engagement with the contacts of its bank one at a time as the switch is stepped and all contactors being ganged to move together, a second step switch having a plurality of contact terminals and a slider moving between said contact terminals and a buss, and the buss being connected to said common output terminal, the contact terminals being connected respectively to the contactors of the banks, said first step switch adapted to be energized by said command signals, and said second step switch adapted to be energized for each complete cycle of the contactors, whereby the common output terminal is connected to the contactor of one bank through the first contact terminal for the first cycle of contactor movement, then is switched to the second contactor through the second contact terminal, and so on until all contacts have been engaged once.

No references cited.